United States Patent
Drath et al.

(10) Patent No.: US 7,447,702 B2
(45) Date of Patent: Nov. 4, 2008

(54) SYSTEM AND METHOD FOR THE STRUCTURALLY DECOUPLED EXCHANGE OF OBJECT-ORIENTED DATA STRUCTURES

(75) Inventors: Rainer Drath, Weinheim (DE); Peter Erning, Brühl (DE); Katharina Gohr, Ladenburg (DE)

(73) Assignee: ABB Patent GmbH, Ladenburg (DE)

( * ) Notice: Subject to any disclaimer, the term of this patent is extended or adjusted under 35 U.S.C. 154(b) by 409 days.

(21) Appl. No.: 11/242,494

(22) Filed: Oct. 3, 2005

(65) Prior Publication Data

US 2006/0074974 A1 Apr. 6, 2006

(30) Foreign Application Priority Data

Oct. 1, 2004 (DE) .......................... 10 2004 047 877

(51) Int. Cl.
*G06F 17/30* (2006.01)
(52) U.S. Cl. .................. 707/103 R; 707/100; 707/200; 707/204
(58) Field of Classification Search ................. 707/103, 707/103 R
See application file for complete search history.

(56) References Cited

U.S. PATENT DOCUMENTS 6,393,434 B1 * 5/2002 Huang et al. ................. 707/200
7,032,003 B1 * 4/2006 Shi et al. ..................... 707/204
2005/0097395 A1 * 5/2005 Dawson et al. ................. 714/20

* cited by examiner

Primary Examiner—Mohammad Ali
Assistant Examiner—Thuy (Tiffany) Bui
(74) Attorney, Agent, or Firm—Laurence A. Greenberg; Werner H. Stemer; Ralph E. Locher

(57) ABSTRACT

A system and a method for a structurally decoupled exchange of objects deposited in variable object-oriented data structures is performed. In a first tool, at least one first object-oriented data structure is deposited and for each object coming from the first tool, of the first data structure, one unambiguous identification mark is allocated. In a second tool, at least one second object-oriented data structure is deposited and for each object, of the second data structure, the unambiguous identification mark of the associated partner object and at least one path information item over the hierarchical position of the associated partner object with the hierarchical position of the object of the second data structure from the first data structure is allocated. A module for comparing the structures taking into consideration the identification marks and path information, is provided, for determining the differences of the structures.

24 Claims, 7 Drawing Sheets

SYSTEM AND METHOD FOR THE STRUCTURALLY DECOUPLED EXCHANGE OF OBJECT-ORIENTED DATA STRUCTURES

BACKGROUND OF THE INVENTION

Field of the Invention

The invention relates to a system and a method for exchanging objects, deposited in variable object-oriented data structures, also called hierarchical object structures hereinafter, between at least two tools, and is suitable for exchanging data between various tools in plant or control system planning of process plants.

Usually, a large number of different planning tools are used for planning a technical plant or a technical process, the data of the plant components being deposited in object-oriented data structures which map the plant structures.

Due to the frequently different configuration and permanent modification of the planning data, the data exchange between the tools is an important prerequisite for a correct and effective work flow in plant or control system planning.

However, the exchange of data between the planning tools is found to be particularly problematic when the hierarchical object-oriented plant data structures in the tools are changed during or after the data transmission and the data has to be repeatedly exchanged between the tools.

A known method for exchanging data between the different planning tools assumes identical structural hierarchies in the planning tools. If the identical structural hierarchies produced due to the data exchange are not changed even during the further planning process, objects changed in the tools involved can be identified due to the correspondence of the structural hierarchies and changed characteristics of the objects deposited in the structural hierarchies can be transferred. Due to the structural equality of the data structures in the tools involved, a repeated exchange of data is also unproblematic since the objects associated with one another in the respective tools, also called partner objects in the text which follows, can be easily found due to the identical positions of the objects in the structural hierarchy of the respective tool. Even when new objects are generated in a structure, the data can be exchanged at any time by positioning a new partner object in the corresponding partner structure via the known parent objects existing in the two structures. This also applies to the deletion of an object.

However, as soon as objects are displaced or renamed in the structures of the tools involved, identification of the corresponding partner objects in the partner structures which have remained unchanged is no longer possible and a data exchange as described in the previous paragraph can no longer be performed due to the structural incompatibility produced.

If, for example, an object is displaced in the structure of a first tool while the corresponding object in the structure of a second tool, the so-called partner tool, remains in its old position, the displaced object is no longer found at its original location during a comparison between the structures.

During a subsequent synchronization of the object structures, the object from the structure of the second tool would again be generated in its old position in the structure of the first tool in its old version and would thus exist twice in the first tool. At the same time, the object displaced in the first tool would be recreated in the structure of the second tool as a result of which doubled objects and a faulty object structure are generated in the second tool.

A further approach to a solution, used at present, for data transmission with changing structural hierarchies is based on issuing an unambiguous identification mark for each object. During the transmission of object information from a first tool into a second tool, this unambiguous identification mark from the first tool is allocated to the objects in the second tool; each object in the structure of the second tool thus knows the identification mark of the partner object from the structure of the first tool and can unambiguously identify its corresponding partner object in the partner structure. Due to the unambiguous identification of the objects by the identification marks, objects can also be displaced within the structural hierarchies without the identifiability of the partner object being lost.

A basic disadvantage of the use of identification marks for identifying the object within the hierarchical structure is based on the fact that not every tool supports the use of identification marks. If the above-mentioned identification by identification marks is not supported by at least one of the tools used, this approach can no longer be used.

A further disadvantage of identifying the objects by using identifications marks is due to the fact that identification marks can change in one of the tools involved during the planning process and thus unambiguity of the identification marks over prolonged periods is not guaranteed.

A further disadvantage of identifying the objects by using identification marks is due to the fact that unambiguous correlation between identification mark and object is not always guaranteed. Although an object can have an unambiguous identification mark, an identification mark does not always need to be allocated to the same object. If, for example, an object with an identification mark is deleted, and if the corresponding identification mark is released and used again for identifying a new object newly inserted into the structure, the structure is still consistent within the first tool but confusion during the comparison with structures from previous versions or partner structures from other tools is possible. In this way, the capabilities of exchanging data can even be completely lost.

In order to avoid the above disadvantages, a further approach to a solution, currently used, is based on using globally unambiguous identification marks. It is true that the use of a globally unambiguous identification number such as, for example, a global unique identifier (GUID), which is generated during the creation of the objects and is transferred during the data exchange between the tools, guarantees one-to-one identification of the objects in the respective structures. But the use of the GUID is not yet established in plant and control system planning. In addition, even the GUID system used can be completely changed or renewed, for example during a change of version. Although the correlation remains constant within a tool, errors can occur in the exchange with partner structures or during a comparison with previous versions because unambiguous identification of the objects can no longer be performed.

Furthermore, the use of identification marks described above does not allow a reconstruction of structural information since a structure or part-structure, which is faulty or destroyed after a data exchange, cannot be reconstructed from a partner structure by use of unambiguous identification marks since identification marks do not contain any structural information.

SUMMARY OF THE INVENTION

It is accordingly an object of the invention to provide a system and a method for the structurally decoupled exchange of object-oriented data structures which overcomes the above-mentioned disadvantages of the prior art devices and methods of this general type.

The system according to the invention for the structurally decoupled exchange of objects deposited in variable hierarchical object structures is based on a repeated bidirectional and/or reversible data exchange between at least two tools.

The data to be transmitted between the tools contain objects which are arranged in an hierarchical data tree, for example in a plant structure, the respective objects containing characteristics, particularly attributes, interfaces and relations to other objects.

The system according to the invention can be used, in particular, for a repeated data exchange between various tools of plant and control system planning in a technical process or a technical plant, the objects deposited in the hierarchical object structures containing information on the plant components to be mapped, on the hierarchical structure of plant components of a technical plant, on the relations of the plant components to one another, on requirements and specifications of the plant elements and/or role-specific identification marks of the plant elements.

The repeated data exchange, carried out by the system according to the invention, between the various tools is of advantage, in particular, when the information of the objects, deposited in the respective tools, and the objects themselves are modified, supplemented, removed, displaced, renamed and/or completed in the course of time.

The system according to the invention for the structurally decoupled exchange of objects deposited in variable hierarchical object structures between at least two tools contains at least one first object-oriented data structure, deposited in a first tool, at least one unambiguous identification mark being allocated to each object, to be transmitted, of the first object structure.

The objects of the first object structure with their unambiguous identification marks can be transferred into a second tool having at least one second object-oriented data structure, wherein in each case the identification mark of the first object, also called source object, and a path information item is allocated to the object of the second data structure, already transferred, which path information item describes the hierarchical position of the origin of the respective object of the second data structure from the first data structure. The partner objects from the first and second data structures, which are to be correlated with one another, are thus mappings onto one another.

A module existing in the system according to the invention compares the structures deposited in the tools, taking into consideration the object-specific identification marks and path information, and determines the differences between the structures.

The objects not existing in the structure of the second tool or changed or to be removed can then be transferred into the second tool with the associated identification marks and to corresponding path information by a further module, and/or deleted.

After a new creation, modification and/or removal of the objects in the data structure of the first tool, particularly by renaming the objects or by displacing the objects within the hierarchical structure, taking into consideration the object-specific identification marks and path information, a new comparison of the structures deposited in the tools can be carried out for determining the differences and for transferring new and/or changed objects between the structures, and the consistency of the data can be restored in an advantageous manner.

In a method, the objects are deposited in a first tool in at least one first object-oriented data structure and for each object, to be transferred, of the first data structure of the first tool, at least one unambiguous identification mark is allocated.

In a second tool, at least one second object-oriented data structure is deposited and for each object transmitted, of the second data structure which comes from the first data structure during the generation during the data exchange process, the unambiguous identification mark and a path information item with the hierarchical position of origin of the object of the second data structure from the first data structure is allocated.

By a module for comparing the structures involved, also called partner structures, taking into consideration the object-specific identification marks and path information, the differences between the structures are determined as a prerequisite for a data exchange. In the structure of the second tool, non-existing and new or altered objects from the structure of the first tool including the identification marks allocated to the respective objects and the corresponding path information is then transferred and objects removed in the first structure are also removed in the second structure.

In an advantageous embodiment of the invention, it is provided that the data exchange between the tools is carried out repeatedly and/or bi-directionally.

In a further advantageous embodiment of the invention, it is provided that the data exchange between the tools is carried out between more than two tools. In this arrangement, there can also be a number of structures in the respective tools.

According to the invention, it is also provided that the data exchange between the tools is carried out reversibly. This allows changes to be cancelled.

Furthermore, it is advantageously provided that after a structural change in the second structure, the new positions of the objects in the first structure are also transmitted automatically or after an explicit request in addition to the transmission of the characteristics of the objects of the first structure, and thus the changed second structure is overwritten with the original first structure. After this structural restoration, the second structure is compatible with the first structure.

A further advantage of the method according to the invention is based on the fact that after a structural change or after a partial or complete loss of the first structure, this can be restored from the second structure even if the second structure no longer corresponds to the original first structure. This is possible because the original position in the first structure is allocated in the form of a path information item to the objects of the second structure which originate from the first structure.

Thus, the flexibility and reliability of the data exchange is advantageously considerably increased by the method according to the invention since faulty or destroyed structure are reconstructed by the method according to the invention.

Usually, the manipulation of objects in a tool with respect to their new creation, modification or deletion are subject to a body of rules which is only known in this tool, also called owner tool. To provide for a data manipulation of the structures deposited in the tools with equal rights also in other tools, the data, generated in the owner tool according to the body of rules, are transferred in an advantageous embodiment of the invention to a further tool in which the said body of rules is not known or only partially known. For this purpose, the body of rules is also wholly or partially transferred into the further tool, in addition to the data, and is there integrated. Objects transferred from the owner tool can also be changed, removed or otherwise modified in the other tool with equal rights or partially with equal rights to the objects of the owner tool—thus, for example, when only renaming but not the displacement of objects is allowed in the further tool because the renaming rules but not the displacement rules have been transferred, due to the body of rules.

To also guarantee faultless data transmission with a simultaneous change of the structures in the tools and the identification marks of the respective objects, a data synchronization is performed in a further embodiment of the invention, before the identification marks are changed, so that the path information between the partner objects is correct in the structures involved. After the change of the identification marks, an object correlation is thus given via the path information and the changed identification marks can be transferred faultlessly into the new structure. Thus, the change of identification marks is harmless for the data exchange.

In consequence, using the method according to the invention, the flexibility and reliability of the data exchange is advantageously considerably increased since changes of identification marks within a tool can be repeated and transferred for other tools. Specifying and correlating the corresponding path information with the objects ensures unambiguous identification of the objects in the structures independently of a change of information stored in the identification marks.

A computer program component for execution on a correspondingly set-up data processing device, which has the features of the method according to the invention, leads to a preferred embodiment of the system according to the invention. A computer program component, particularly a computer program stored on a data medium which has the features of the method according to the invention is, therefore, expressly included in the content of the disclosure of the present application.

Other features which are considered as characteristic for the invention are set forth in the appended claims.

Although the invention is illustrated and described herein as embodied in a system and a method for the structurally decoupled exchange of object-oriented data structures, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
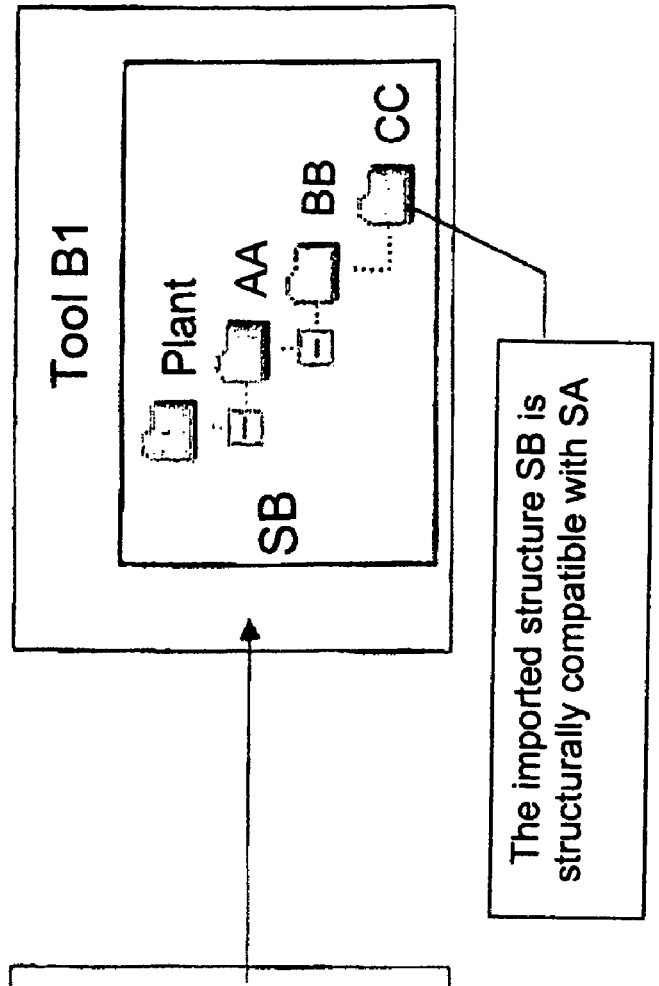
FIG. 1 is an illustration showing an embodiment of a system for transmitting data between two tools according to the prior art.

Referring now to the figures of the drawing in detail and first, particularly, to FIG. 1 thereof, there is shown a system for transmitting data from a first tool A1 into a second tool B1 according to the prior art, wherein a structure SA is imported from the first tool A1 into the second tool B1 as structure SB and the imported structure SB of the second tool B1 is structurally compatible with the structure SA of the first tool A1.

The objects located in the structures SA and SB contain information on a hierarchical structure of plant components of a technical plant, on the relations between the plant components, on requirements and specifications of the plant elements and/or role-specific indication marks of the plant element.

Since the structural hierarchies of the structures SA and SB are identical, the characteristics of the objects A, B, C, AA, BB, CC, which are, for example, attributes and interfaces and relations to other objects, can be changed in the two structures SA and SB, after a first synchronization, and due to the structural equality in the tools A1, B1, a new exchange of data is unproblematic since the objects A, B, C, AA, BB, CC from the structures SA and SB are unambiguously identified and compared by their hierarchical position and their own name during the comparison. In consequence, the corresponding partner objects can be found in the structures SA and SB due to unchanged positions and identical names of the objects A, B, C, AA, BB, CC. The object pairs (A, AA), (B, BB), (C, CC) from in each case the first structure SA and the second structure SB (A, AA), (B, BB), (C, CC) represent partner objects and are identified by identical position in the structures and by identical names.

Creating new objects during the data exchange is possible at any time by positioning the new objects in the partner structure via the known parent objects which exist in the two identical structures SA and SB.

However, as soon as objects within the structures SA and SB are displaced or renamed (see FIG. 2), the corresponding partner objects can no longer be unambiguously correlated in the two structures SA and SB and faultless and complete data exchange is no longer guaranteed.

Figure 2:
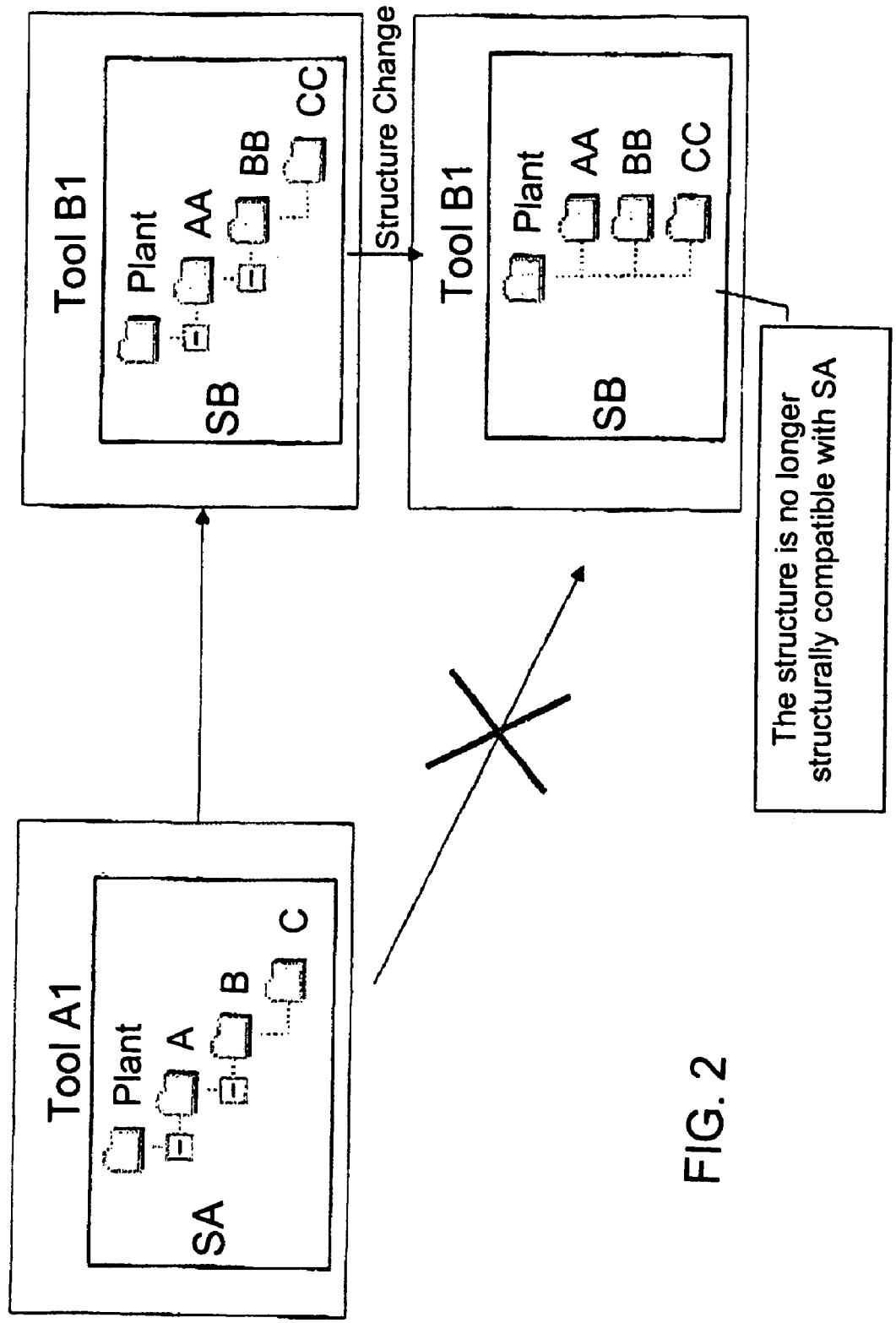
FIG. 2 is an illustration showing an example of a change in a hierarchical structure in a tool.

If, as shown in FIG. 2, for example an object BB in the structure SB of the second tool B1 is displaced while the corresponding partner object B remains in its old position in the structure SA of the first tool A1, a comparison of the structures SA and SB would determine that the object BB has been deleted at its original location and recreated at another place. During the synchronization of the data, the corresponding object B would be recreated at its old position in the structure SB of the second tool B1 and would exist twice in the structure SB of the second tool B1. At the same time, the displaced object BB would be recreated at its new position within the structure SA of the first tool A1 and thus double objects would be generated, possibly in different versions.

Figure 3:
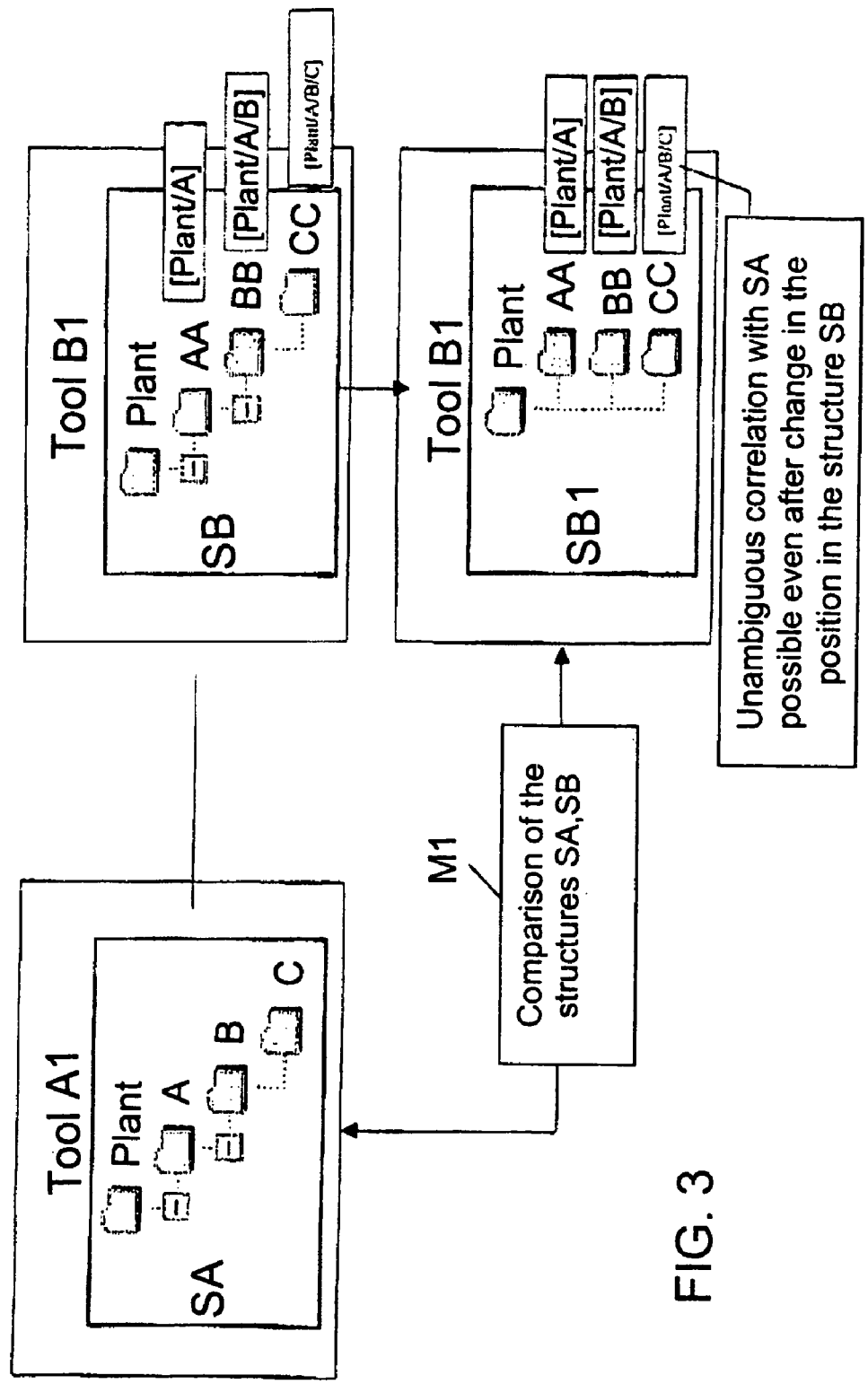
FIG. 3 is an illustration showing an example of a correlation of the path information with imported objects.

FIG. 3 shows an example of the allocation of the path information plant/A, plant/A/B, plant/A/B/C of the objects transferred between the first tool A1 and the second tool B1, an information item about the hierarchical position of the corresponding partner object in the structure SA of the first tool A1 being allocated to each object AA, BB, CC in the structure SB of the second tool B1 as complete path information item plant/A, plant/A/B, plant/A/B/C.

Thus, a displacement and/or renaming of the objects AA, BB, CC of the structure SB of the second tool B1 can be advantageously performed since an unambiguous correlation with the structure SA of the first tool A1 is possible via the path information. For this reason, changes in the structure SB of the second tool B1 are harmless for finding corresponding partner objects in the structure SA of the first tool A1.

As well, the structure SA of the first tool A1 can be reconstructed from the structure SB of the second tool B1 if the structure SA is completely or partially destroyed or faulty due to a loss of data. In this context, the structure SA of the first tool A1 is reconstructed from the structure SB of the second tool B1 even if the objects AA, BB, CC in the structure SB of the second tool B1 have been displaced or renamed.

Thus, the original structure SA of the first tool A1 is restored even if the structure SB of the second tool B1 has a different structure SB1. In this context, the construction contains the last state of information, known in the structure SB of the second tool B1, of the structure SA of the first tool Al.

Use of the path information plant/A, plant/A/B, plant/A/B/C as information of the origin of the objects makes it possible for object responsibilities to be automatically recognized. Each object AA, BB, CC of the second tool B1, which was transferred from the first tool A1, contains information on its hierarchical origin. Each object in the second tool B1 without this information can be unambiguously allocated as belonging to the second tool B1 or not coming from the first tool A1 and can be separately treated during data synchronization.

So that not only the objects AA, BB, CC are renamed and displaced in the structure SB of the second tool B1 but, at the same time, the objects A, B, C of the structure SA of the first tool A1 are also renamed or displaced, the objects A, B, C are in each case allocated the identification mark 1, 2, 3 and the objects AA, BB, CC are allocated the respective identification mark, 1, 2, 3 of the source objects A, B, C. This is illustrated in FIG. 4.

Figure 4:
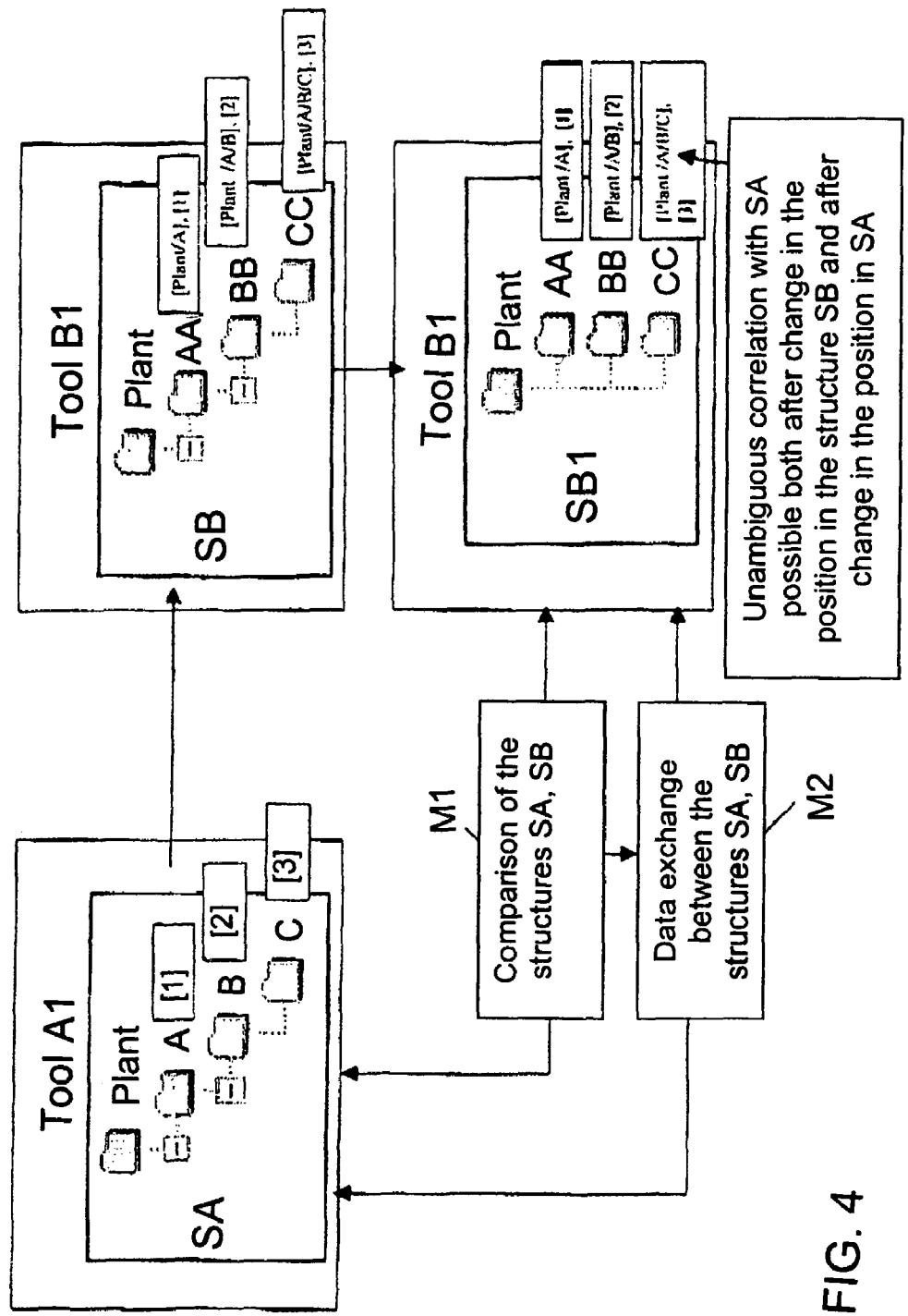
FIG. 4 is an illustration showing an embodiment of the system according to the invention for a repeated exchange of objects deposited in variable hierarchical object structures.

FIG. 4 shows an embodiment of the system according to the invention for the repeated structurally decoupled exchange of objects A, B, C, AA, BB, CC, deposited in variable object-oriented data structures SA and SB, between at least two tools A1 and B1, wherein at least one first object-oriented data structure SA is deposited in a first tool A1 and an unambiguous identification mark 1, 2, 3 is allocated to each object A, B, C of the data structure SA of the first tool A1. In this arrangement, the object-oriented data structures SA and SB map, for example, the plant structures of a technical plant.

In a second tool B1, at least one second object-oriented data structure SB is deposited and for each object AA, BB, CC, coming from the first tool A1, of the second data structure SB, the unambiguous identification mark 1, 2, 3 and a path information item plant/A, plant/A/B, plant/A/B/C with the hierarchical position of origin of the object AA, BB, CC of the second data structure SB from the first data structure SA is allocated as source information.

The path information of the objects AA, BB, CC of the second structure describes, in particular, the hierarchical information of origin of the objects AA, BB, CC from the first structure SA of the first tool A1. Thus, each object AA, BB, CC from the second structure SB can be unambiguously identified via its identification mark 1, 2, 3 and its path information plant/A, plant/A/B, plant/A/B/C based on its partner object A, B, C from the first structure SA of the first tool A1.

An unambiguous correlation of partner objects is possible via the identification marks 1, 2, 3, additionally transferred during the data exchange, even when the structure SA has been changed in the first tool A1 since the new position information is transferred during the data exchange between the tools A1, B1.

The objects A, B, C, AA, BB, CC of the structures SA and SB can be renamed and/or displaced at the same time since an unambiguous correlation is possible by the common identification marks. In this context, the new path information of the partner objects must be updated again after the data transmission.

If the identification marks 1, 2, 3 are changed, an unambiguous correlation of the partner objects in the structures SA and SB is possible via the path information plant/A, plant/A/B, plant/A/B/C and the changed identification marks must again be adjusted after the data exchange for ensuring consistency of the information contained in the objects A, B, C, AA, BB, CC. A module M1, integrated in the system according to the invention, for comparing the structures SA and SB deposited in the tools A1, B1, taking into consideration the identification marks 1, 2, 3 allocated to the objects and path information plant/A, plant/A/B, plant/A/B/C, automatically determines the differences between the structures. A further module M2 according to FIG. 4 transfers the objects, not existing in the structure SB of the second tool B1 or changed, from the structure SA of the first tool A1 with the associated identification marks 1, 2, 3 and the corresponding path information plant/A, plant/A/B, plant/A/B/C into the second tool B1.

After a modification of the objects A, B, C in the data structure SA of the first tool A1, taking into consideration the object-specific identification marks 1, 2, 3 and path information plant/A, plant/A/B, plant/A/B/C, a new comparison of the structures SA and SB, deposited in the tools A1, B1, can be carried out for determining the differences and for transferring new, altered objects and/or objects to be deleted between the structures SA and SB.

For example, FIG. 4 shows in the second tool B1 a change in the structure SB into a new structure SB1, wherein the objects AA, BB, CC of the new structure SB1, originating from the first structure SA, can be unambiguously correlated with the corresponding partner objects in the first tool A1 by the path information plant/A, plant/A/B, plant/A/B/C, remaining unchanged, and identification marks 1, 2, 3.

The data exchange between the tools A1, B1 can be advantageously repeatedly performed, particularly after a renaming of the objects A, B, C, AA, BB, CC and/or a displacement of the objects A, B, C, AA, BB, CC within the hierarchical structures SA and SB. In this context, a faulty or destroyed structure can be reconstructed by the respective partner structure.

The described system of the directional data exchange from the structure SA of the first tool A1 to the structure SB of the second tool B1 can also be carried out for the reverse data exchange from the structure SB of the second tool B1 to the structure SA of the first tool A1, objects created in the second tool B1 being transferred to the first structure SA and the local objects, originating from the second structure SB, being allocated source information about the corresponding partner objects from the structure SB of the second tool B1. In consequence, a balanced bidirectional data exchange can be carried out.

Figure 5:
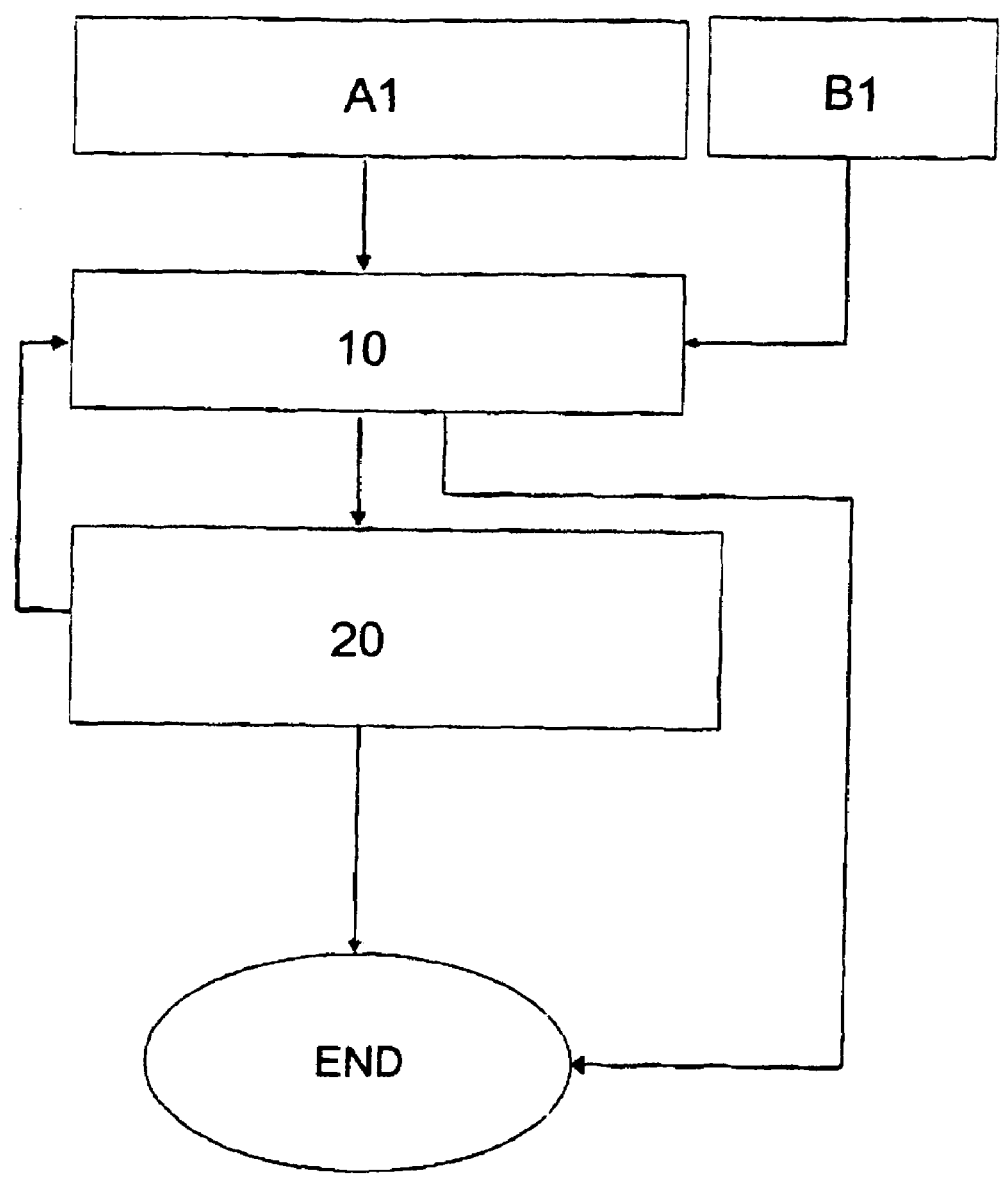
FIG. 5 is a flow chart showing an exemplary automatic method sequence which illustrates an embodiment of the system according to the invention.

FIG. 5 shows an exemplary automatic method sequence which illustrates an embodiment of the system according to the invention, a first object-oriented data structure SA being deposited in a first tool A1 and to each object A, B, C of the first data structure SA, which is to be transmitted, of the first tool A1 in each case an unambiguous identification mark 1, 2, 3 is allocated.

In a second tool B1, a second object-oriented data structure SB is stored and for each object AA, BB, CC of the second data structure SB, originating from the first tool A1, the corresponding unambiguous identification mark 1, 2, 3 from the first data structure SA and a path information item plant/A, plant/A/B, plant/A/B/C with the hierarchical position of the object AA, BB, CC of the second data structure SB from the first data structure SA is allocated.

In a first step 10, the differences, particularly objects newly generated, changed, renamed, deleted or displaced in the structures SA and SB, between the structures SA and SB are determined by the module M1 for comparing the structures SA and SB, deposited in the tools A1, B1, taking into consideration the identification marks 1, 2, 3 allocated to the objects and any path information plant/A, plant/A/B, plant/A/B/C, which may be present.

In a second step 20, objects from the structure SA of the first tool A1, nonexistent or changed in the structure SB of the second tool B1, are transferred into the second tool B1 with the associated identification marks 1, 2, 3 and the corresponding path information plant/A, plant/A/B, plant/A/B/C by the further module M2, objects deleted in the first structure SA are deleted in the second structure SB and/or new partner objects generated in the second structure SB receive the corresponding identification mark and the path information item of the source object from the first structure SA.

After a modification of the objects A, B, C in the data structure SA of the first tool A1, the method sequence is run through again.

Using the method according to the invention, the data exchange between the tools A1, B1 is repeated, performed bi-directionally and/or reversibly within the hierarchical structures SA and SB, particularly after a renaming of the objects A, B, C, AA, BB, CC, a change in the position of the objects A, B, C, AA, BB, CC or a displacement of the objects A, B, C, AA, BB, CC, as a result of which faulty or destroyed structures become reconstructable.

The method according to the invention is particularly suitable for the directional data exchange from the first tool A1 to the second tool B1. After a data transmission from the structure SA of the first tool A1 into the structure SB of the second tool B1, the structure SB of the second tool B1 can be changed independently of the structure SA of the first tool A1 without the reference to the structure SA of the first tool being lost.

Figure 6:
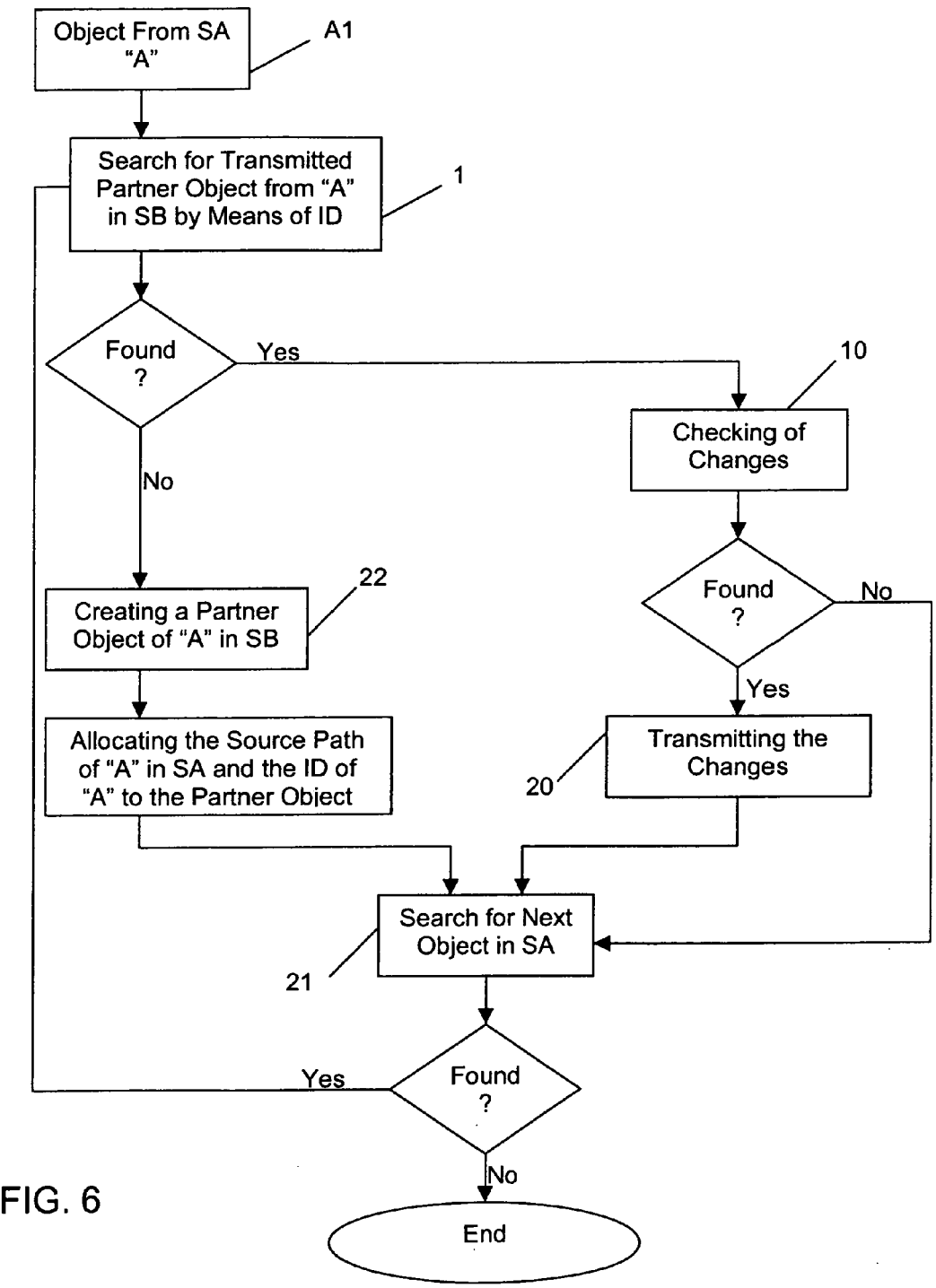
FIG. 6 is a flowchart for determining and transferring new and/or changed objects from the first tool to the second tool.
Figure 7:
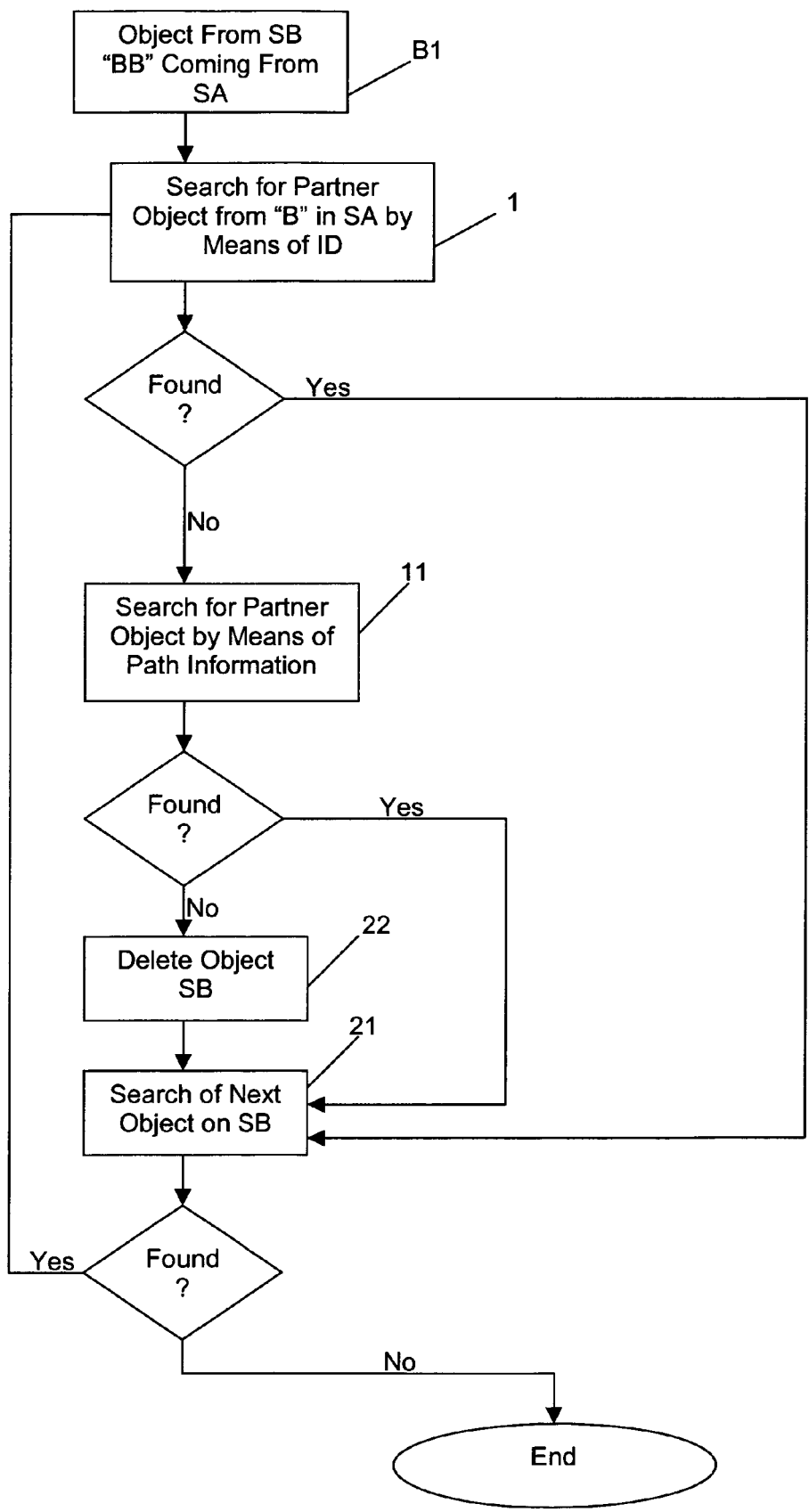
FIG. 7 is a flowchart for determining objects to be deleted in the second tool.

FIGS. 6 and 7 show flowcharts for representing the data transmission from the first tool A1 to the second tool B1, the object "A" to be transferred being deposited in the structure SA in the first tool A1. FIG. 6 describes the determination and transmission of new and changed objects within the structure SA of the first tool A1, whereas FIG. 7 represents the determination of objects to be deleted in the second structure SB, that is to say objects deleted in the first structure SA, and the subsequent process of deletion. According to FIG. 6, in a preparatory step 1, the corresponding partner object AA to the object A in the structure SA of the first tool A1 is sought in the structure SB of the second tool B1 on the basis of the associated identification mark.

After a successful search, the object A is compared to the partner object AA from the structure SB of the second tool B1 in the first step 10. If there are changes, the differences or changes in the object A of the first tool A1 are transferred to the partner object AA in the second step 20 and the next object to be transmitted is sought in the structure SA of the first tool A1 in a next step 21.

If no differences or changes between the object A and the partner object AA are found, the next object to be transmitted is sought in the structure SA of the first tool A1 in the next step 21.

If it is found in the next step 21 that there are no further objects or object characteristics to be transmitted, this section of the method of the data exchange between the tools A1, A2 is ended.

If, however, the search for a partner object, performed in the preparatory step 1, is not successful and, accordingly, there is no partner object to the object A in the structure SA of the first tool A1 in the structure SB of the second tool B1, a partner object is created in the structure SB of the second tool B1 in a step 22, the partner object created being allocated the path information item of the object A of the structure SA of the first tool A1, also called source path, and the identification mark of the object A to the partner object, and the method sequence, is run through as described in the next step 21.

FIG. 7 shows a flowchart for determining objects BB of the second structure SB which no longer have a partner object in the first structure SA and have thus been removed from the first structure SA. In a preparatory step 1, the corresponding partner object B of the object BB, originating from the first structure SA, of the second structure SB is sought in the first structure SA of the first tool A1 on the basis of the associated identification mark. If the partner object B is found in the first structure SA, this processing cycle can be ended and the next partner object B to the next object BB of the second structure SB is sought in a next step 21.

If, however, the next partner object B is not found in the first structure SA, a new search of the partner object B in the first structure is performed in a further step 11 on the basis of the path information item present for the object BB of the second structure SB. If the object B is now found in the first structure SA, this processing cycle can be ended and a further object BB is sought in the structure SB in a next step 21.

If, however, the further object B is not found in the first structure SA, either on the basis of the identification mark present in the object BB of the second structure SB or on the basis of the path information item present in the object BB of the second structure SB, the object B has been removed from the first structure SA and must thus also be removed from the second structure SB. This is done in step 22 and the method sequence is continued in the next step 21.

If it is found in the next step 21 that there are no further objects, originating from the first data structure SA, to the partner object BB from the second structure, the method sequence is ended.

We claim:

1. A system for a structurally decoupled exchange of objects, deposited in variable object-oriented data structures, the system including a processor and a memory, and further comprising:
   a first tool having at least one first object-oriented data structure deposited therein and for each object to be transferred, of the first object-oriented data structure, at least one unambiguous identification mark being allocated to the object;
   a second tool having at least one second object-oriented data structure deposited therein and for each object transferred, of the second object-oriented data structure, the at least one unambiguous identification mark and at least one path information item with a hierarchical position of the object of the second object-oriented data structure from the first object-oriented data structure is allocated;

a module for comparing said first and second object-oriented data structures, taking into consideration the unambiguous identification mark and the path information item, said module determining differences between said first and second object-oriented data structures;

objects newly created in said second object-oriented data structure of said second tool, objects not existing and/or changed in said second object-oriented data structure can be transferred from said first object-oriented data structure of said first tool with the unambiguous identification mark and the path information item into said second object-oriented data structure of said second tool; and said first and second object-oriented data structures mapping plant structures of a technical plant and said objects, deposited in said first and second object-oriented data structures, containing information on a hierarchical structure of plant components of the technical plant, on relations of plant components to one another, on requirements and specifications of plant elements and/or role-specific identification marks of the plant elements.

2. The system according to claim 1, wherein after a new creation, modification and/or removal of said object in said first object-oriented data structure of said first tool, taking into consideration the unambiguous identification mark and the path information item, a new comparison of said first and second object-oriented data structures can be carried out for determining the differences and for transmitting new and/or changed objects between said first and second object-oriented data structures and/or deleting objects.

3. The system according to claim 1, wherein a data exchange between said first and second tools can be carried out repeatedly.

4. The system according to claim 1, wherein a data exchange between said first and second tools can be carried out bi-directionally and/or reversibly.

5. The system according to claim 1, wherein the path information item contains information on an origin of said object of said second object-oriented data structure.

6. The system according to claim 1, wherein a modification of said objects in said first and second object-oriented data structures of said first and second tools include a renaming of said objects and/or a change in a position of said objects within said first and second object-oriented data structures.

7. The system according to claim 1, wherein during a transmission of said objects into said first and second object-oriented structures of said first and second tools, characteristics, relations and/or positions of said objects can also be transmitted.

8. The system according to claim 7, wherein the positions of said objects can also be transmitted automatically or on request.

9. The system according to claim 1, wherein data generated in said first tool in accordance with a body of rules valid in said first tool and said body of rules itself can be transferred into said second tool, in which the said body of rules is not known or only partially known, and said objects transferred from said first tool can be modified or removed with equal rights to said objects of said first tool.

10. The system according to claim 1, wherein said objects not to be transmitted between said first and second object-oriented data structures of said first and second tools do not have any information on origin.

11. The system according to claim 1, wherein said objects to be transmitted between said first and second object-oriented data structures can be distinguished by at least one feature of objects not to be transmitted.

12. A method for a structurally decoupled exchange of objects, deposited in variable object-oriented data structures, between at least two tools, which comprises the steps of:

depositing in a first tool, at least one first object-oriented data structure having objects; allocating to each object, to be transferred, of the first data structure of the first tool, at least one unambiguous identification mark;

depositing in a second tool, at least one second object-oriented data structure having objects;

allocating to each object, of the second data structure, the at least one unambiguous identification mark and at least one path information item with a hierarchical position of the object of the second object-oriented data structure from the first data structure;

comparing, in a module, the first and second object-oriented data structures, taking into consideration the unambiguous identification mark and the path information item, for determining differences between the first and second object-oriented data structures;

transferring objects newly created in the second object-oriented data structure of the second tool, objects not existing and/or changed in the second object-oriented structure from the first object-oriented data structure of the first tool with the identification marks and the path information items into the second object-oriented data structure of the second tool;

mapping in plant structures in the first and second object-oriented data structures; and storing in the first and second object-oriented data structures, the objects with information on a hierarchical structure of plant components of a technical plant, on relations of the plant components to one another, on requirements and specifications of plant elements and/or role-specific identification marks of the plant elements.

13. The method according to claim 12, wherein after a new creation, modification and/or removal of the objects in the first object-oriented data structure of the first tool, taking into consideration the unambiguous identification mark and the path information item, carrying out a new comparison of the first and second object-oriented data structures for determining differences and for transmitting new and/or changed objects between the first and second object-oriented data structures and/or deleting objects.

14. The method according to claim 12, which further comprises carrying out a data exchange between the first and second tools repeatedly.

15. The method according to claim 14, which further comprises carrying out the data exchange between the first and second tools bi-directionally and/or reversibly.

16. The method according to claim 12, which further comprises carrying out an unambiguous correlation of the objects in the first tool after an automatic determination and transmission of the differences between the first and second object-oriented data structures deposited in the first and second tools.

17. The method according to claim 12, which further comprises providing in the path information item, information on an origin of the objects.

18. The method according to claim 12, wherein the objects are removed and/or modified within the first and second object-oriented structures of the first and second tools.

19. The method according to claim 12, which further comprises during a transmission of the objects into the first and second object-oriented structures of the first and second tools, characteristics, relations and/or positions of the objects are also transmitted.

20. The method according to claim 19, which further comprises transmitting the positions of the objects automatically or on request.

21. The method according to claim 12, which further comprises transferring data generated in the first tool in accordance with a body of rules valid in the first tool and the body of rules itself into the second tool, in which the body of rules is not known or only partially known, and the objects transferred from the first tool are modified or removed with equal rights to the objects of the first tool.

22. The method according to claim 12, wherein the objects not to be transmitted between the first and second object-oriented structures of the first and second tools do not have any information on their position of origin.

23. The method according to claim 22, wherein the objects to be transmitted are distinguished by at least one feature of the objects not to be transmitted.

24. The method according to claim 18, which further comprises performing the modified step by one of renaming, changing or displacing, the object.

* * * * *

UNITED STATES PATENT AND TRADEMARK OFFICE
CERTIFICATE OF CORRECTION

PATENT NO. : 7,447,702 B2  
APPLICATION NO. : 11/242494  
DATED : November 4, 2008  
INVENTOR(S) : Rainer Drath et al.

Page 1 of 1

It is certified that error appears in the above-identified patent and that said Letters Patent is hereby corrected as shown below:

Title page, Item (73) Assignee should read as follows:

(73)    Assignee:   ABB Research LTD, Zürich, (CH)

Signed and Sealed this
Twenty-second Day of January, 2013

David J. Kappos
*Director of the United States Patent and Trademark Office*